United States Patent
Taylor

[11] 3,757,591
[45] Sept. 11, 1973

[54] DISENGAGEABLE NUT AND SCREW ARRANGEMENT

[75] Inventor: Peter Graham Taylor, Cambridge, England

[73] Assignee: Cambridge Scientific Instruments Limited, Cambridge, England

[22] Filed: Sept. 30, 1971

[21] Appl. No.: 185,258

[30] Foreign Application Priority Data
Sept. 30, 1970 Great Britain.................. 46,617/70

[52] U.S. Cl............... 74/89.15, 33/165, 74/424.8 A
[51] Int. Cl........................................... F16h 27/02
[58] Field of Search.................... 74/89.15, 424.8 A; 33/165

[56] References Cited
UNITED STATES PATENTS

| 1,589,307 | 6/1926 | Svebilius | 74/424.8 A |
| 2,261,537 | 11/1941 | Zamarra | 74/424.8 A |
| 2,430,458 | 11/1947 | Farrell | 74/424.8 A |
| 3,049,807 | 8/1962 | Smeets | 33/165 |
| 3,535,793 | 10/1970 | Williams et al. | 33/165 |

Primary Examiner—Charles J. Myhre
Assistant Examiner—Wesley S. Ratliff, Jr.
Attorney—Wigman & Cohen

[57] ABSTRACT

A nut and screw arrangement particularly for scientific instruments having a lead nut and screw in which the nut has two bores inclined with one another, the one plain and the other screw threaded and means for tilting the nut into and out of engagement of the lead screw so that part of the apparatus may be advanced finely by the screw and coarsely manually.

3 Claims, 15 Drawing Figures

Patented Sept. 11, 1973

INVENTOR
PETER GRAHAM TAYLOR
BY
Natter, Wigman & Natter
ATTORNEYS

Patented Sept. 11, 1973

INVENTOR
PETER GRAHAM TAYLOR
BY
Nathan, Wigman & Nathan
ATTORNEYS

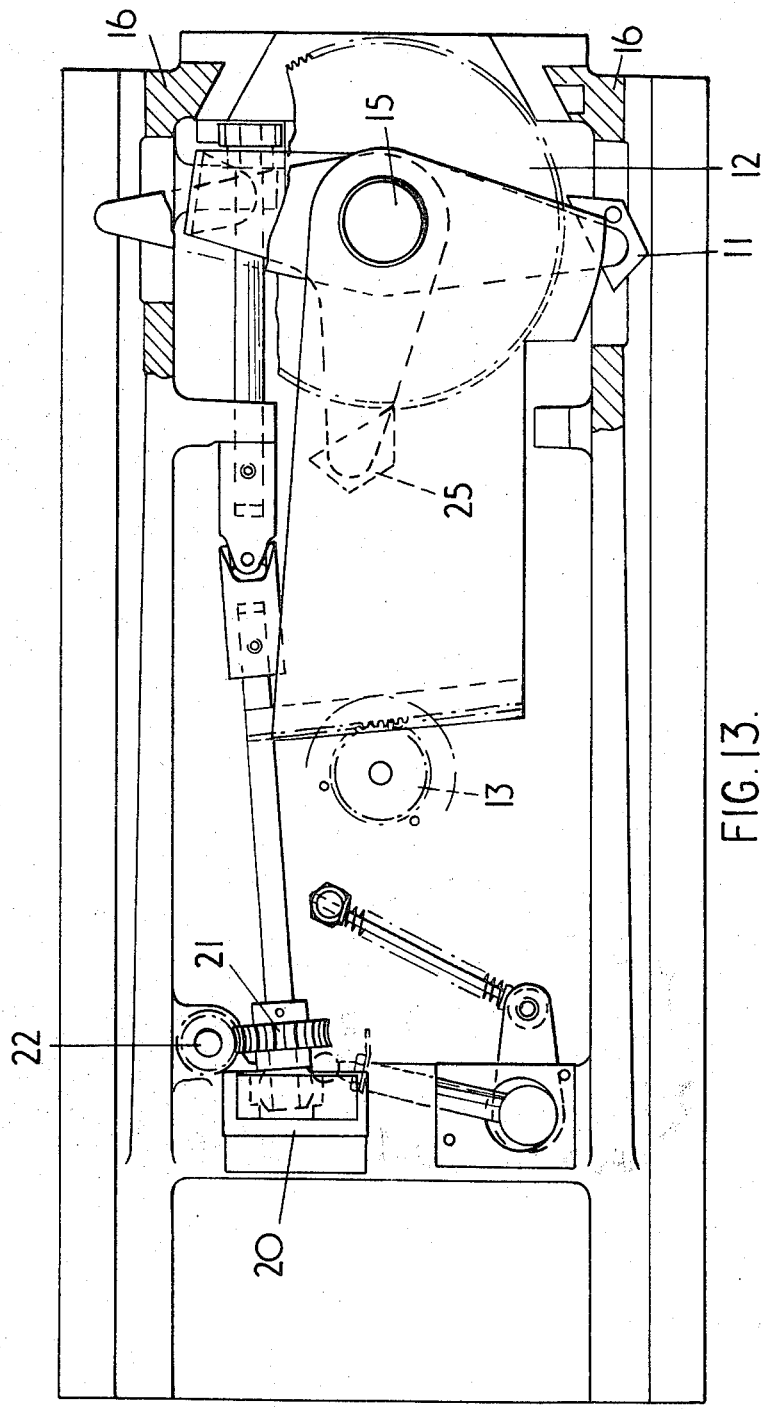

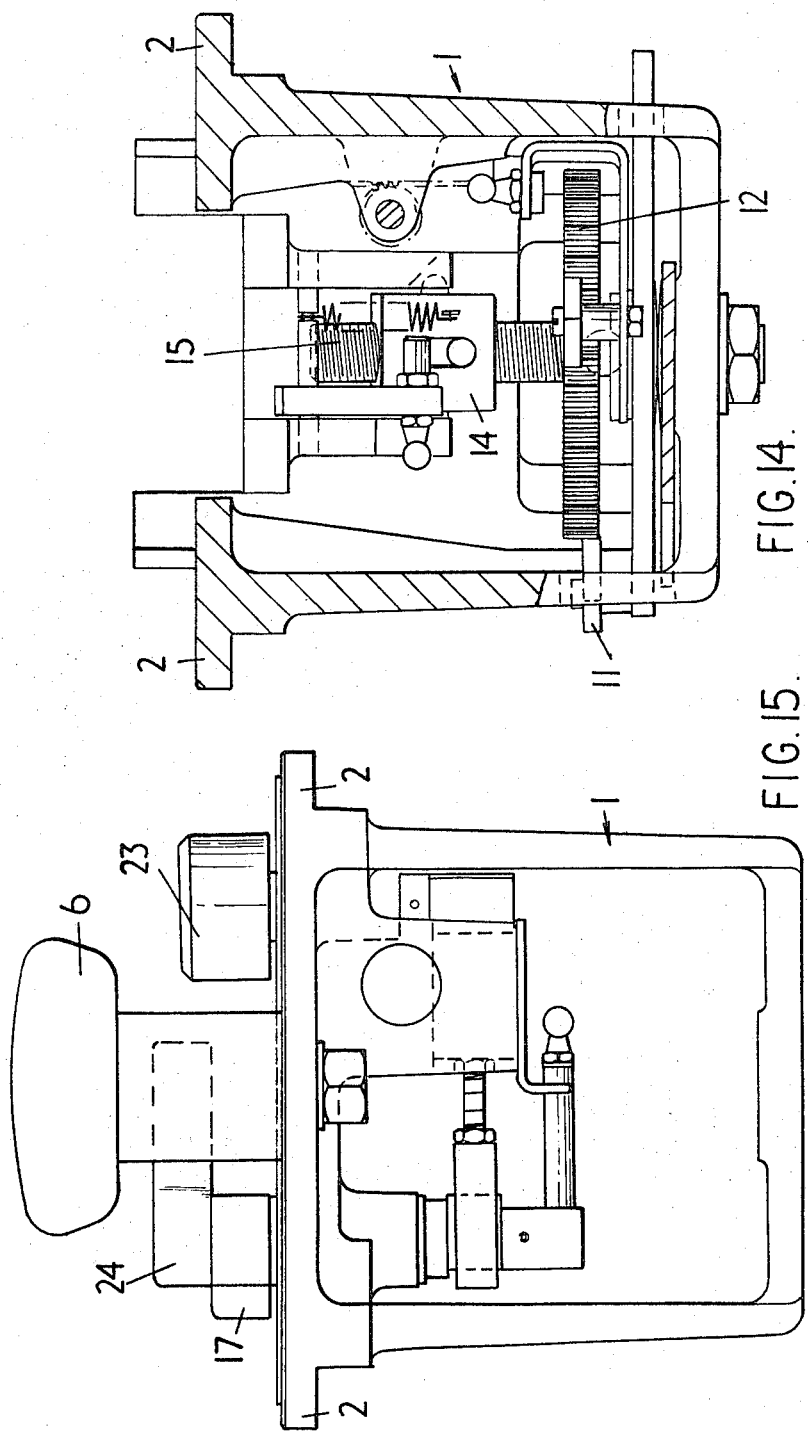

DISENGAGEABLE NUT AND SCREW ARRANGEMENT

The invention relates to a disengageable nut and screw arrangement, and particularly, but not exclusively, to a disengageable nut and lead screw arrangement for scientific instruments.

In the conventional nut and screw arrangement where, for example, a travelling microscope on parallel support bars is caused to move across a support base by means of the rotation of a lead screw engaging a nonrotatable nut on the microscope, it is essential for one to rotate the lead screw within the nut to move the microscope from every point to every point within the range of movement. This is a time consuming procedure when the position of the microscope has to be changed some considerable degree, and it is the object of the invention to provide a disengageable nut and screw arrangement in which the nut can be disengaged from the screw and moved quickly from one place to another and then re-engaged.

The invention consists in a nut and screw arrangement in which there is a longitudinal aperture through the nut which in part comprises a screw threaded bore which is of such dimensions that it will co-operate with the thread upon the screw, characterized in that the nut in part comprises a plain cylindrical bore which is of such dimensions as will form a sliding fit upon the thread of the screw, the axis of the screw threaded bore and the axis of the plain cylindrical bore cutting one another at an angle, and having means for varying the relative position of the two axes so that when the axis of the screw is positioned such that it coincides with the axis of the screw threaded bore the thread on the two members engage, and when the axis of the screw is positioned such that it coincides with the axis of the plain cylindrical bore, the two members may slide freely relative to one another.

The invention further consists in a nut and screw arrangement as set forth in the preceding paragraph in which the point at which the said axes cut one another is intermediate the ends of the nut.

The invention still further consists in a nut and screw arrangement as set forth in the preceding paragraph in which the point at which the said axes cut one another is halfway between the ends of the nut.

The invention still further consists in a scientific instrument having a part moveable relative to another part to adjust the instrument for use, characterized in incorporating a nut and screw arrangement as set forth above, for adjusting the relative movements of said parts either finely or coarsely as desired.

The accompanying drawings show, by way of example only, several embodiments of the invention, in which, FIG. 1 shows diagrammatically a travelling microscope the position of which is varied progressively by a nut and screw arrangement, and in which the nut is disengageable from the thread of the screw in accordance with the invention.

Figure 7:
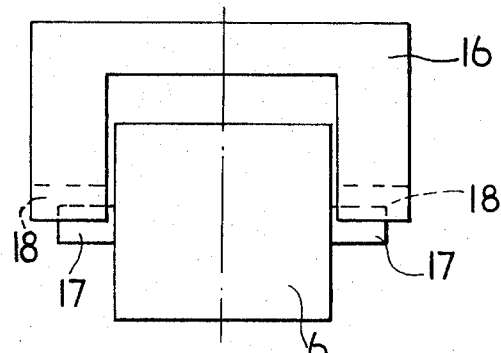
Figure 8:
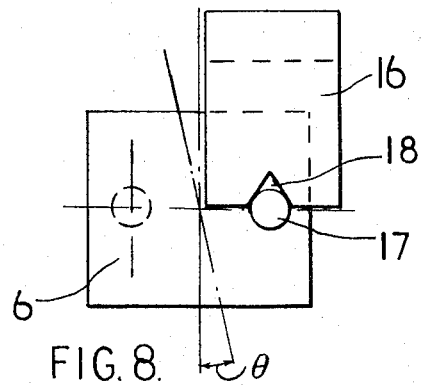
Figure 9:
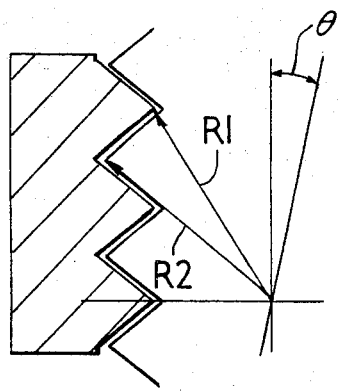
Figure 10:
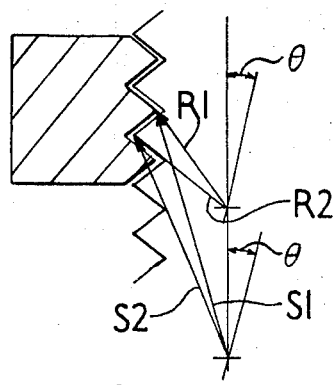
Figure 5:
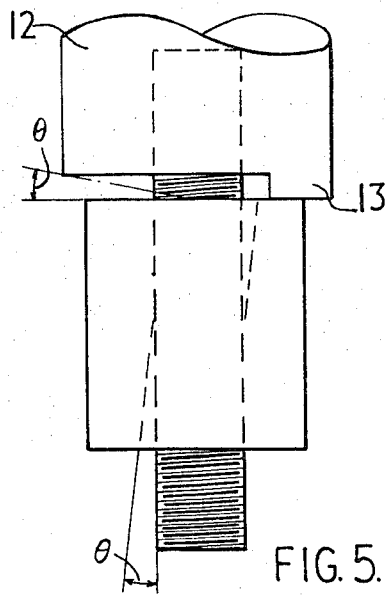
Figure 6:
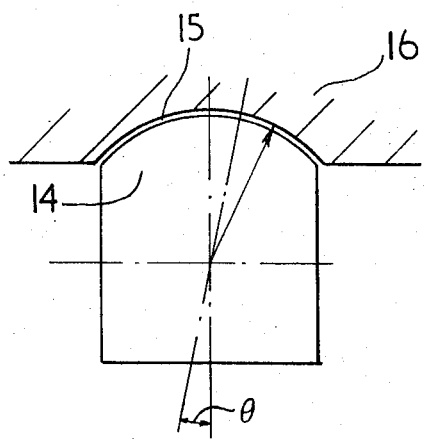
Figure 11:
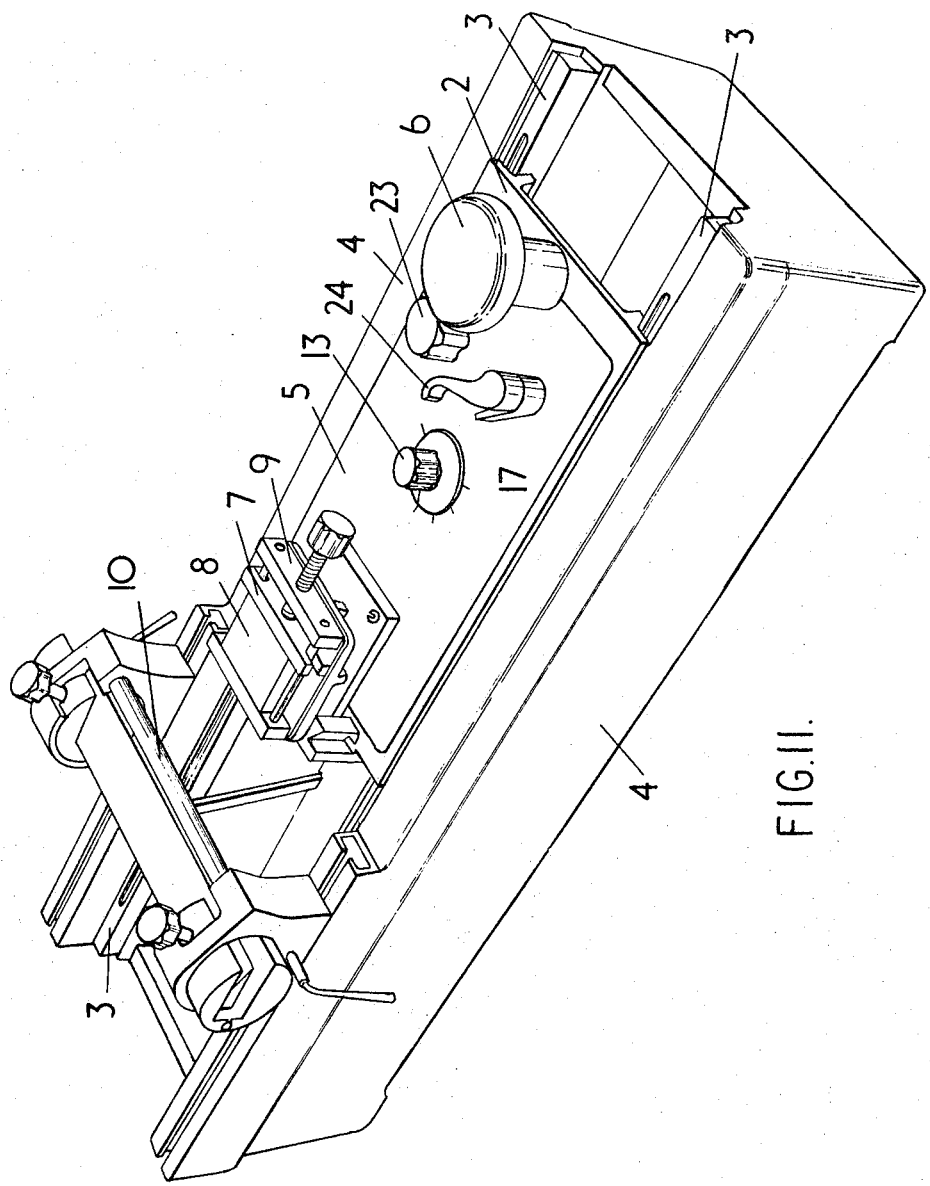
Figure 12:
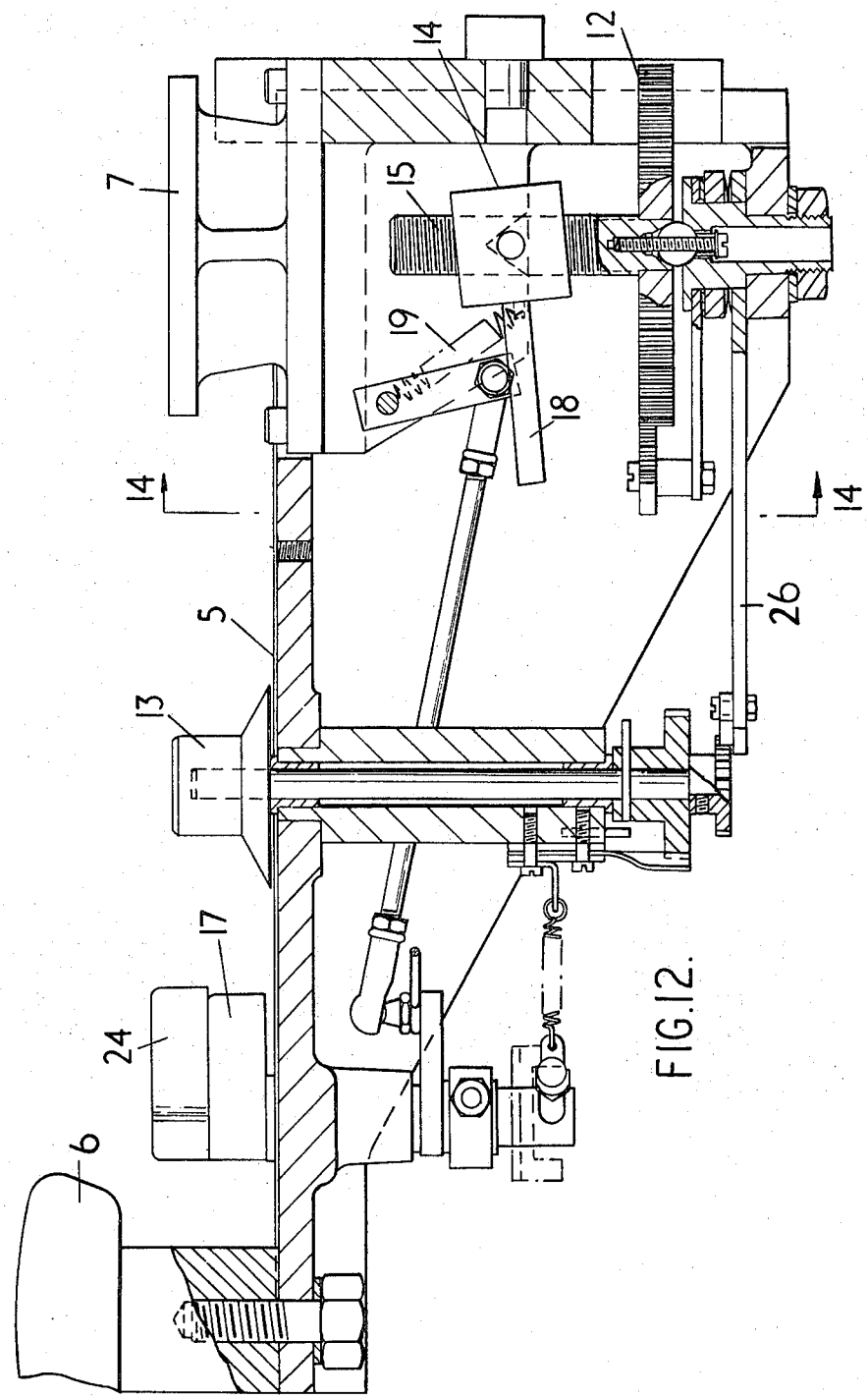

FIG. 5 is a side elevation of a nut and screw arrangement with rotatable tilting means for the nut, FIG. 6 is a detail showing a nut with a part spherical end, FIGS. 7 and 8 show in elevation two views of a further nut and screw arrangement with rotatable tilting means for the nut, FIGS. 9 and 10 show diagrammatically the effect of the choice of thread and choice of point of cutting of axes respectively, FIG. 11 is a perspective view of a sledge microtome incorporating a nut and screw arrangement constructed in accordance with the present invention, FIG. 12 is a longitudinal section of the sledge portion of the instrument of FIG. 11, FIG. 13 is an inverted plan view of the body portion of the instrument of FIG. 11, FIG. 14 is a cross section of the instrument on the line 14—14 of FIG. 12, while FIG. 15 is an end elevation of the sledge portion.

Figure 1:
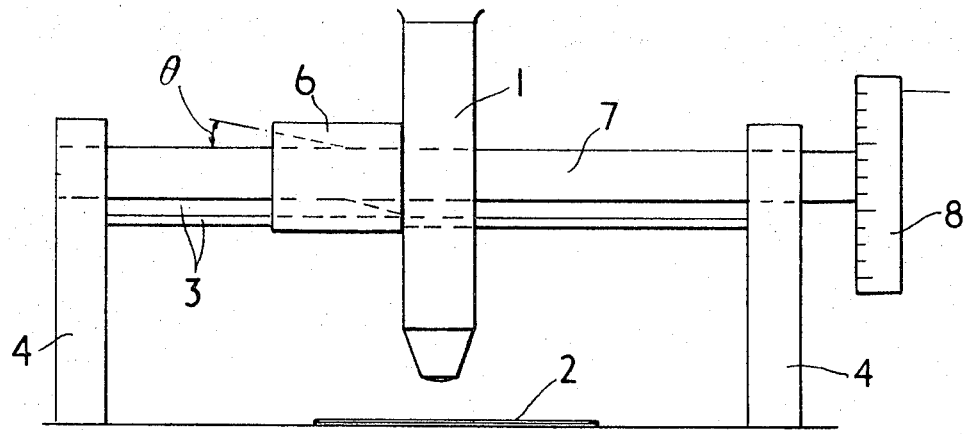

FIG. 1 shows diagrammatically a typical arrangement of a travelling microscope 1 constrained to follow a rectilinear path across the specimen 2 by contacting guide rails 3 supported upon end members 4 upon a base 5. The microscope 1 is provided with a nut 6 constructed in accordance with the invention, which co-operates with a lead screw 7, rotatable by means of a calibrated drum 8 attached thereto. When the nut 6 is in the position as shown in the figure the microscope moves progressively either way by rotating the drum. By tilting the nut 6 relative to the lead screw 7 the threads on the two members become disengaged, and the microscope may be slid to a new position directly without rotating the drum 8 and then re-engaged for microscopic movement of the instrument.

Figure 2:
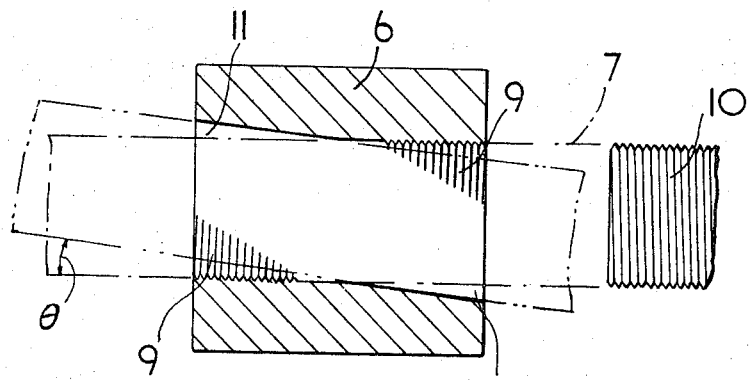
FIG. 2 is a part longitudinal section part elevation of a simple disengageable nut and screw arrangement.
Figure 3:
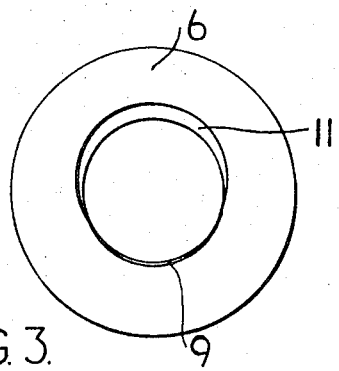
FIGS. 3 and 4 are end elevations of the nut of FIG. 2.
Figure 4:
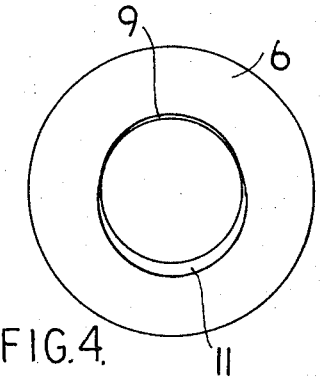

In one form of construction the microscope is supported upon the nut and the nut rests against the guide rails 3 to prevent it turning. When the microscope 1 is tilted by hand the nut is tilted, and the threads become disengaged. How this is effected is clearly seen from FIGS. 2, 3 and 4. The nut 6 is firstly provided with an axial screw threaded bore 9 which co-operates with the thread 10 on the lead screw 7. It is then tilted through an angle which can vary depending upon the nature of the thread and the position of the point of intersection of the axes, and a plain bore 11 is made which is a sliding fit upon the thread of the lead screw. FIGS. 3 and 4 are end elevations of the left and right ends of the nut 6 respectively as viewed in FIG. 2.

FIG. 5 shows the application of the invention to a jack like form of construction in which the load is applied vertically downwards to the rotatable member 12 which has a stepped portion 13. In the figures the load is applied by the stepped portion 13 to the side of the nut which causes engagement of the screw threads as shown. When the rotatable member 12 is rotated 180° the nut is tilted so that the threads become disengaged. In practice the rotatable member is firstly rotated to the disengaged position, in which the weight of the rotatable member 12 keeps the nut tilted. The nut is then lifted by hand until engagement is made with the load. The rotatable member is then rotated 18° to engage the threads and the load is lifted by rotating the screw.

When it is desired to avoid the tendency of the load to tilt the nut either one way or the other, the nut may be formed with a part spherical projection 14, see FIG. 6, which fits in a part spherical recess 15 in a loaded member, the center of the sphere being concentric with the point of cutting of the axes of the screw threaded part of the bore with the plain part of the bore. Furthermore, in this construction the effect of tilting the nut does not impart any longitudinal movement of the loaded member.

In the construction shown in FIGS. 7 and 8 the nut 6 is provided with projection 17 which engages with V shaped recesses 18 in the loaded member 16. In this case the load acts to tilt the nut to cause disengagement of the screw threads.

If in the construction shown in FIG. 8 the projection 17 is repositioned as shown by the dotted lines, when in this case the load acts to tilt the nut to cause disengagement of the screw thread.

In general, the nut can be of any convenient shape or size, depending upon its application. For instance, a square holed nut using strips of rack could be used, but owing to the line contact between the lead screw thread and the rack the rate of wear would be excessive.

The device makes use of the increasing clearance between the mating threads as the nut is tilted about the point of intersection of the axis of the lead screw with the axis of the plain bore, and in consequence the dimension R1 must be greater than R2. See FIGS. 9 and 10. The angle of the teeth may be varied but R2 must not exceed R1.

The effect of moving the point of cutting of the axes to a position outside the nut is to progressively equalize R1 and R2. See FIG. 10, from which it can be seen that the difference between R1 and R2 is greater than between S1 and S2.

If the point of cutting of the axes is then moved further and further away then it is possible to use any shape of thread form in this device.

The force required to disengage the nut is approximately proportional to the load supported by the nut.

The instrument shown in FIGS. 11 to 15 is a sledge microtome constructed in two main parts, a sledge portion 1 of box like form with open ends and having flanges 2 upon which the sledge portion rests upon slideways 3 along the inner surface of the slides 4 of the box like base of the apparatus.

The slidable sledge portion 1 carries upon its upper surface 5 a knob 6, by means of which the sledge is movable back and forth upon the slideways 3 of the box like base. There is also provided on the upper surface 5 a specimen holder 7, which holds a specimen 8 by means of the clamp 9. As the specimen 8 moves along, a thin section is cut by the knife 10.

On the forward stroke the specimen holder 7 is raised by a pawl 11 operating against and turning a toothed wheel 12, the extent of engagement being controlled by the knob 13, while the lever 26 controls the extent of movement of the pawl 11 on its return stroke. By this means the thickness of the section of the specimen is controlled.

Rotation of the toothed wheel 12 rotates the disengageable nut 14, constructed in accordance with the invention, along a lead screw 15. The nut 14 is associated with the specimen table 7, and slides it in the grooves 16 to adjust its height.

By rotation of the lever 17 in an anti-clockwise direction, two functions are performed. Firstly push rod 18 attached to the nut 14 is moved downwards against the action of a spring 19 thus tilting the nut 14 from the lead screw 15, in accordance with the invention. The nut thereby becomes disengaged, from the lead screw, for rapid movement there along. Simultaneously with this release the block 20 is moved to engage gears 21 and 22 which are normally disengaged.

A few turns of the knob 23 moves the nut 14 and hence the specimen holder 7, from one end of the lead screw 15 to the other or to any intermediate position. When the lever 17 is returned to its original position the reverse function takes place, and the nut 14 becomes engaged with the lead screw 15 and is held there by the spring 19.

It may be clearly seen from the above description that when the nut 14 is engaged with the lead screw 15 the specimen holder 7 is raised a constant and adjustable distance each time the sledge portion of the apparatus is reciprocated by means of the knob 6, but when the nut 14 is disengaged from the lead screw 15, the specimen holder 7 moves up and down in an uninterrupted manner by means of the knob 23. By this means the appropriate relative levels between the specimen and the knife can be obtained at the commencement of a run of cuts preparatory to the engagement of the nut 14 and lead screw and the cutting of a run of equal thickness specimens obtained.

The upper lever 24 operates the pawl 25, by means of which the specimen table 7 may be lifted step by step in fine stages without the necessity of sliding the table each time.

It is to be understood that the above description is by way of example only and that details for carrying the invention into effect may be varied without departing from the scope of the invention.

I claim :

1. In combination with a precision instrument, an adjusting mechanism comprising an externally threaded fine adjusting screw rotatable about its longitudinal axis, a nut having at least a partially threaded bore interengaging with said screw through which an axial force may be transmitted to said nut upon rotation of said screw, said nut including a smooth bore having a diameter larger than the diameter of said screw extending therethrough at an angle to said partially threaded bore and having an axis which intersects the axis of said partially threaded bore at substantially the midpoint thereof, means for rotating said nut about a tilting axis extending through said point of intersection and perpendicular to the axis of said screw for selectively aligning said screw with either said partially threaded bore or said smooth bore, whereby said nut may be slid axially over said screw when said smooth bore is aligned with said nut and said nut may be translated relative to said screw upon rotation thereof when said partially threaded bore is aligned with said screw, the resultant of the force transmitted by said screw to said nut upon rotation of said screw passing through said tilting axis.

2. The combination of claim 1 wherein said adjusting screw is disposed vertically.

3. The combination of claim 1 wherein said precision instrument is a sledge microtome.

* * * * *